US011269168B2

(12) United States Patent
Bertoncini et al.

(10) Patent No.: US 11,269,168 B2
(45) Date of Patent: Mar. 8, 2022

(54) PRINTED CATADIOPTRIC HIGH NUMERICAL APERTURE LENS AND METHOD

(71) Applicant: KING ABDULLAH UNIVERSITY OF SCIENCE AND TECHNOLOGY, Thuwal (SA)

(72) Inventors: Andrea Bertoncini, Thuwal (SA); Carlo Liberale, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 263 days.

(21) Appl. No.: 16/227,286

(22) Filed: Dec. 20, 2018

(65) Prior Publication Data

US 2020/0033571 A1  Jan. 30, 2020

Related U.S. Application Data

(60) Provisional application No. 62/702,485, filed on Jul. 24, 2018.

(51) Int. Cl.
*G02B 17/08* (2006.01)
*G02B 21/02* (2006.01)
*G02B 27/00* (2006.01)

(52) U.S. Cl.
CPC ............ *G02B 17/086* (2013.01); *G02B 21/02* (2013.01); *G02B 27/0012* (2013.01)

(58) Field of Classification Search
CPC ...... G02B 17/086; G02B 21/33; G02B 21/02; G02B 27/0012; G02B 3/08; G02B 21/086;

(Continued)

(56) References Cited

U.S. PATENT DOCUMENTS 2,831,394 A    4/1958  Heenan et al.
5,404,869 A *  4/1995  Parkyn, Jr ......... G02B 19/0028
                                                        126/699

(Continued)

FOREIGN PATENT DOCUMENTS

DE     3827834 A1   2/1990
DE    19646239 A1   5/1998
EP     3130950 A1   2/2017

OTHER PUBLICATIONS

Hong-Bo et al., "Two-Photon Polymerization And 3D Lithographic Microfabrication," Advances in Polymer Science, vol. 170, 169-273, 2004.*

(Continued)

*Primary Examiner* — Stephone B Allen
*Assistant Examiner* — Rahman Abdur
(74) *Attorney, Agent, or Firm* — Patent Portfolio Builders PLLC

(57) ABSTRACT

A catadioptric high-aperture optical element includes a substrate made of a transparent material; and a lens formed on the substrate. The lens includes, plural refractive features formed on a central portion of the lens, and plural reflective features formed on a ring portion of the lens. The plural refractive features are shaped to refract light incoming from the substrate and the plural reflective features are shaped to achieve total internal reflections with the light incoming from the substrate.

23 Claims, 15 Drawing Sheets

(58) Field of Classification Search
CPC .. G02B 17/006; G02B 19/0028; G02B 21/26; G02B 21/30; G03F 7/2041; B33Y 80/00
USPC .......................................................... 359/395
See application file for complete search history.

(56) References Cited

U.S. PATENT DOCUMENTS

| | | | |
|---|---|---|---|
| 6,252,724 B1* | 6/2001 | Scheer | G02B 3/08 359/723 |
| 8,389,893 B2 | 3/2013 | Kempe et al. | |
| 9,091,420 B2* | 7/2015 | Woodgate | F21V 5/007 |
| 2006/0082905 A1* | 4/2006 | Shafer | G03F 7/70225 359/727 |
| 2010/0219353 A1* | 9/2010 | Akiyoshi | G02B 21/0088 250/459.1 |
| 2016/0133771 A1* | 5/2016 | Pelletier | H02S 40/22 136/259 |
| 2016/0143589 A1* | 5/2016 | Kabetani | A61B 5/702 600/476 |
| 2018/0239096 A1 | 8/2018 | Houbertz et al. | |

OTHER PUBLICATIONS

Extended European Search Report in corresponding/related EP Application No. 19180323.8, dated Nov. 21, 2019.

* cited by examiner

PRINTED CATADIOPTRIC HIGH NUMERICAL APERTURE LENS AND METHOD

CROSS-REFERENCE TO RELATED APPLICATIONS

This application claims priority to U.S. Provisional Patent Application No. 62/702,485, filed on Jul. 24, 2018, entitled "3D PRINTED HIGH-NA ULTRA-THIN CATADIOPTRIC CONDENSER FOR REMOVAL OF CROSS-PHASE MODULATION IN STIMULATED RAMAN SCATTERING MICROSCOPY," the disclosure of which is incorporated herein by reference in its entirety.

BACKGROUND

Technical Field

Embodiments of the disclosed subject matter generally relate to a system and method for manufacturing a high numerical aperture lens, and more specifically, to a 3D printed catadioptric lens having a small height.

Discussion of the Background

Various types of microscopy techniques are used today to image biological experiments with live cells, which usually requires the use of an incubator to control environmental conditions for survival of the sample. In the case of "top-stage" incubators, as illustrated in FIG. 1A, an incubator 100 has a housing 110, usually made out of plastic\metal, which is closed (sealed) with a lid 112, which has a transparent window. One or more live cells 114 are incubated inside the housing 110 and their evolution in time is desired to be observed and analyzed. Because of their small size, advanced microscopes 130 (example, Stimulated Raman Scattering-SRS microscopes) are used to image the living cells. Such an advanced microscope 130 uses a high numerical aperture (NA) objective 132 that directs light 134 from a source of light 136 (usually from a laser) to the cell 114. In a detection scheme called "forward collection", the light gets refracted at the cell 114, and this light 116 (light 116 might be fluorescence, or other types of light) is captured by another high-NA objective 140, that is located opposite to the first high-NA objective 132, as illustrated in FIG. 1B. This second high-NA objective 140 collects the light and sends it to a detection optical path 142 for imaging. Other microscopes have a similar arrangement. The structure of the SRS microscope 130 shown in FIGS. 1A and 1B is extremely simplified for a better understanding of the problems facing the current microscopes.

A height H of the incubator 110 is in the order of cm, while a distance D between the second high-NA objective 140 and the first high-NA objective 132 should be in the order of mm, which is called working distance. Due to the constraint imposed by this small distance, table top incubators are not used with a high-NA objective in "forward collection" mode since the lid 112 of the incubator 100 should be removed, as illustrated in FIG. 1B, to let the second high-NA objective 140 to be brought as close as necessary to the cell 114, i.e., inside the incubator.

However, a problem with this solution is the fact that the forward collection is important in some applications, and thus, there is a need to use such high-NA objectives with a table top incubator. Another problem with the solution illustrated in FIGS. 1A and 1B is the fact that an environment 118 of the cells 114 is controlled, for example, by tubes 150 as illustrated in FIG. 1A. Oxygen and/or other chemical elements is provided through tube 150. In one application, the tube may provide heated air or an increased pressure. When the lid 112 is removed as illustrated in FIG. 1B, the tube providing the chemicals and regulating the atmosphere of the cells 114 is removed, which means that the environment of the cells cannot be effectively regulated while the microscope is used for imagining the cells.

Thus, the cells are taken out of their desired environment while being imaged, which may alter their behavior and/or characteristics. This means that the measurements performed with the microscope do not reflect the state of the cells for the desired environment, but rather a response of the cells to the new environment, which is undesired. This is so because the second high-NA objective lens 140 is very large (in the order of cm) so that it cannot fit between the housing 110 and the lid 112.

Thus, there is a need for a method and an improvement to the microscope to be able to perform "forward collection" with a high-NA objective in such a way to not disturb the environment of the cells while the cells are imaged.

SUMMARY

According to an embodiment, there is a catadioptric high-aperture optical element that includes a substrate made of a transparent material and a lens formed on the substrate. The lens includes plural refractive features formed on a central portion of the lens, and plural reflective features formed on a ring portion of the lens. The plural refractive features are shaped to refract light incoming from the substrate and the plural reflective features are shaped to achieve total internal reflections with the light incoming from the substrate.

According to another embodiment, there is a method for defining a catadioptric high-aperture optical element, the method including a step of selecting a length d of plural refractive features, a step of selecting a maximum angle of an incoming light beam, a step of selecting a separation angle that defines an interface between the plural refractive features and plural reflective features, a step of calculating three edges of each of the plural refractive features relative to a central point of the optical element, a step of calculating four edges of each of the plural reflective features relative to the central point of the optical element, and a step making the optical element with a two-photon process or a 3D printing subtractive method to have the plural refractive features and the plural reflective features.

According to still another embodiment, there is a microscopy system that includes a microscope, an incubator configured to hold at least one cell in a fluid, and a catadioptric high-aperture optical element configured to be placed in the fluid inside the incubator. The catadioptric high-aperture optical element has a total height smaller than 500 μm.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to an SRS microscope. However, the novel optical element discussed herein can be applied to any microscope and in fact to any device that needs light collimation.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is an optical element that is very thin (e.g., less than 300 µm) and 3D printed, capable of collimation of a highly-divergent beam in the visible/infrared spectral range. Such optical element is a catadioptric condenser lens having a high-numerical aperture. The catadioptric condenser lens has long undercut features that cannot be realized by traditional removal methods. Due to its small height and good collimation properties, this catadioptric condenser lens is appropriate for being used inside a small height incubator chamber in conjunction with a microscope, for collimating the electromagnetic waves focused by an objective of the microscope. This catadioptric condenser lens is now discussed in more detail with regard to the figures.

Figure 1A:
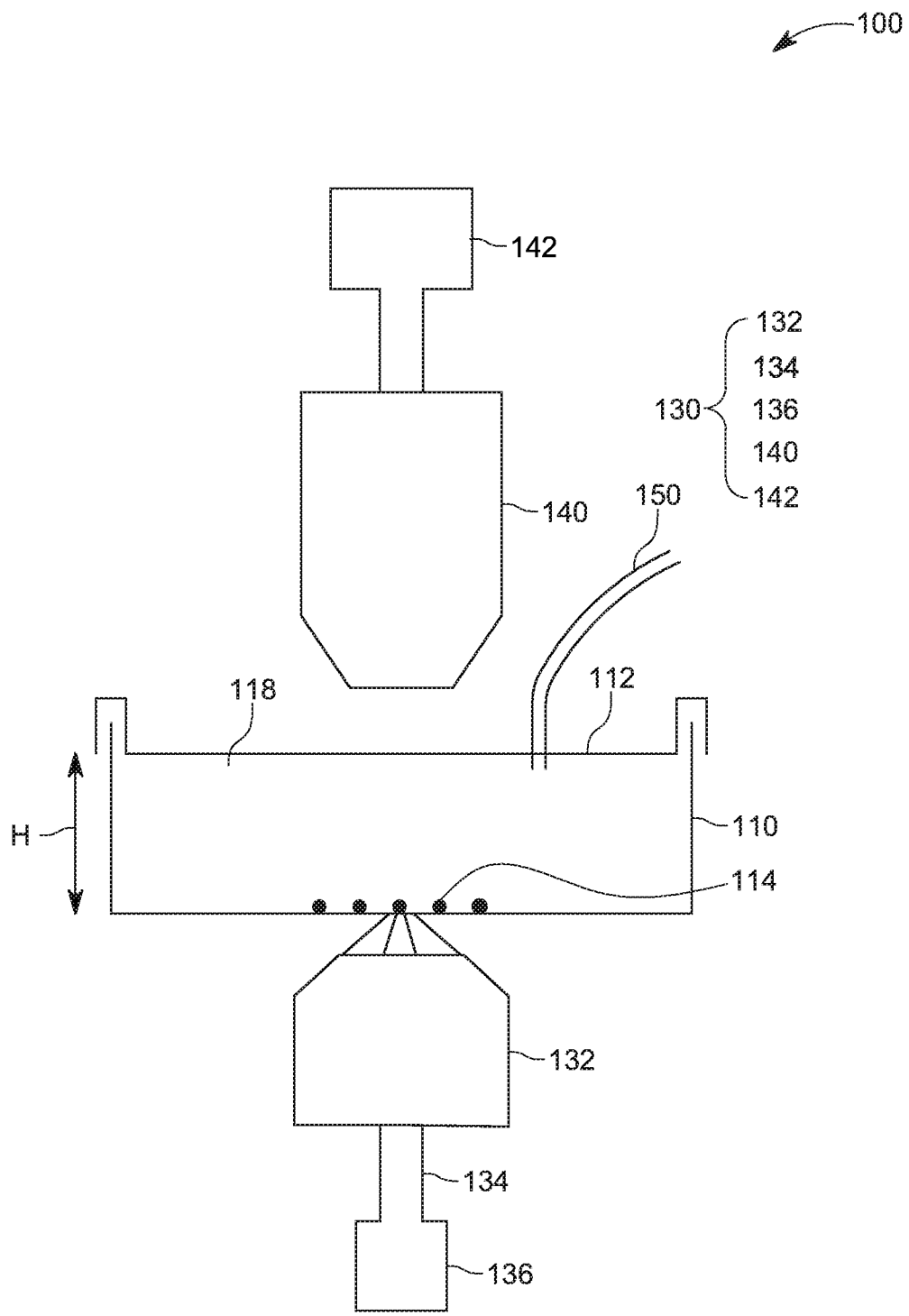
FIGS. 1A and 1B illustrate a conventional microscope used with an incubator for studying a cell.
Figure 2:
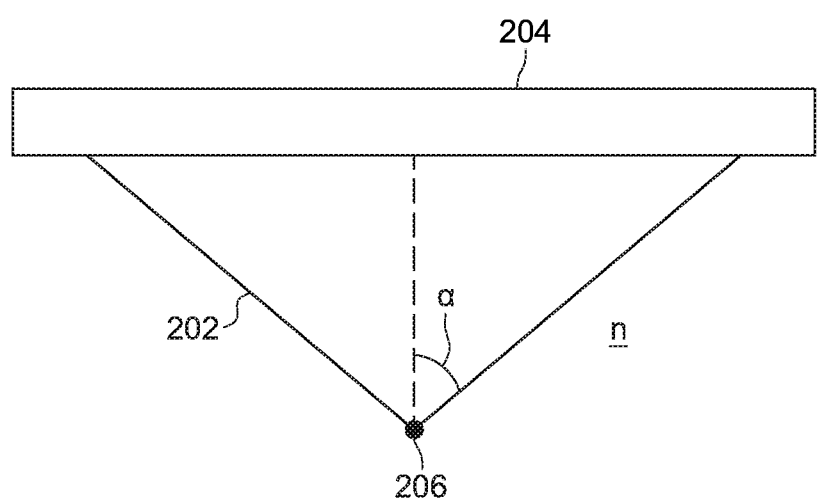
FIG. 2 illustrates a numerical aperture of a lens.

The numerical aperture (NA) of a lens is defined, for the purpose of this application, as expressing the range of angles of an optical beam, and it is mathematically described as being NA=n*sin(maximum angle $\alpha$), where, as illustrated in FIG. 2, n is the refractive index of the medium, and the angle $\alpha$ is the angle of the incoming beam 202 on the lens 204 relative to a normal to the lens. The beam 202 is emitted in FIG. 2 by a point source 206, which may correspond to the cell 114 in FIG. 1A. In air (n=1) a collimated beam (straight rays) has NA=0, a beam with rays up to 45 degrees on both sides has a NA of 0.7, and a beam with rays up to 85 degrees on both sides has a NA of 0.996.

Figure 3:
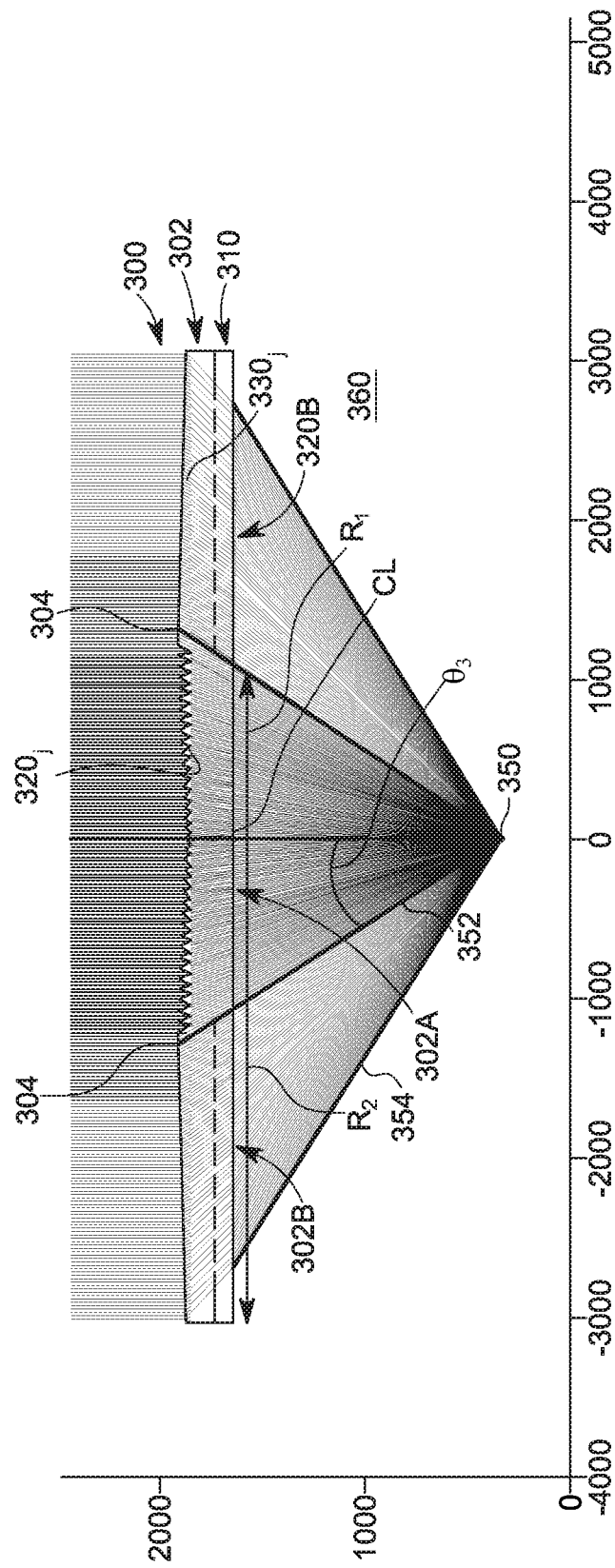
FIG. 3 illustrates a catadioptric high-aperture optical element that has a small height so that it fits inside the incubator.

FIG. 3 illustrates an optical element 300 that includes a catadioptric condenser lens 302 (called simply lens herein) that is formed on a coverslip 310 (also called a substrate). The coverslip 310 may be made of glass or any transparent material. The lens 302 may be made integrally with the coverslip 310 or separately. In one application, a thickness of the coverslip 310 is between 50 and 200 µm, with a preferred value of 170 µm, while a thickness of the lens 302 is between 50 µm and 1 mm, with a preferred thickness of 300 µm. For the preferred values noted above, a total thickness of the optical element 300 is about 470 µm.

Figure 4:
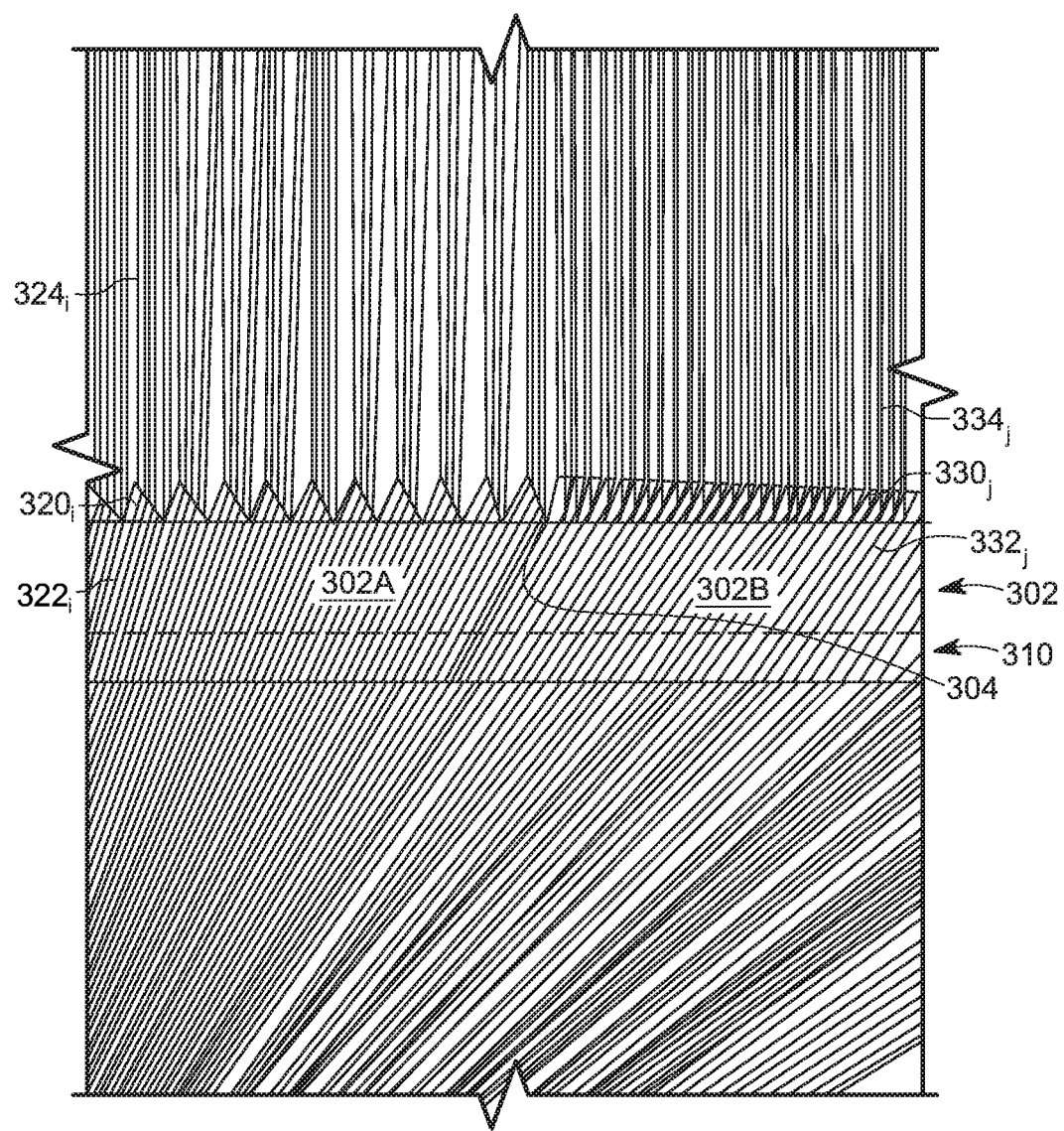
FIG. 4 illustrates plural reflective and plural refractive features of the lens and associated light rays.

While the coverslip 310 has no features (or elements), the lens 302 has plural refractive features 320i and plural reflective features 330j, which are better seen in FIG. 4. FIG. 3 shows that the plural refractive features 320i are located in a central region 302A of the lens 302, while the plural reflective features 330j are located around the central region 302A, in a ring area 302B. In one application, the central region 302A is a circle and the ring area 302B is a ring. The radius R1 of the central region 302A and the radius R2 of the ring area 302B are selected depending on the type of microscopy used, the type of incubator, the type of the target (what kind of sample to be imaged), and how far will the lens be from the point source (or focal point) 350 of the beam. For example, the radius R2 can be in the order of cm. In FIG. 3, the angle between a light ray 352 that falls at the interface 304 between the central region 302A and the ring area 302B is selected to be about 34°. Other angles can be selected. The angle between the light ray 352 and another light ray 354 that falls at the outer diameter of the ring area 302B is selected to also be about 34°. Other angles can be selected. However, the design of the lens is completely scalable, i.e., there is no fundamental limit regarding the size/working distance/NA of the lens (except that a maximum NA of the lens is equal to the refractive index of the medium in which the sample is immersed).

FIG. 4 shows that a light ray 322i that falls on a refractive feature 320i is refracted (that is the reason why feature 320i is called a refractive feature) while a light ray 332j that falls on a reflective feature 330j experiences total internal reflection. Note that i and j may have any values, they may be the same or different. After the light rays 324i and 334j escape the lens 302 at the upper part, they are substantially collimated (i.e., substantially parallel to each other), as illustrated in FIG. 4. Returning to FIG. 3, the lens 302 may be placed in a fluid medium 360. In one application, the fluid medium is water.

Figure 5:
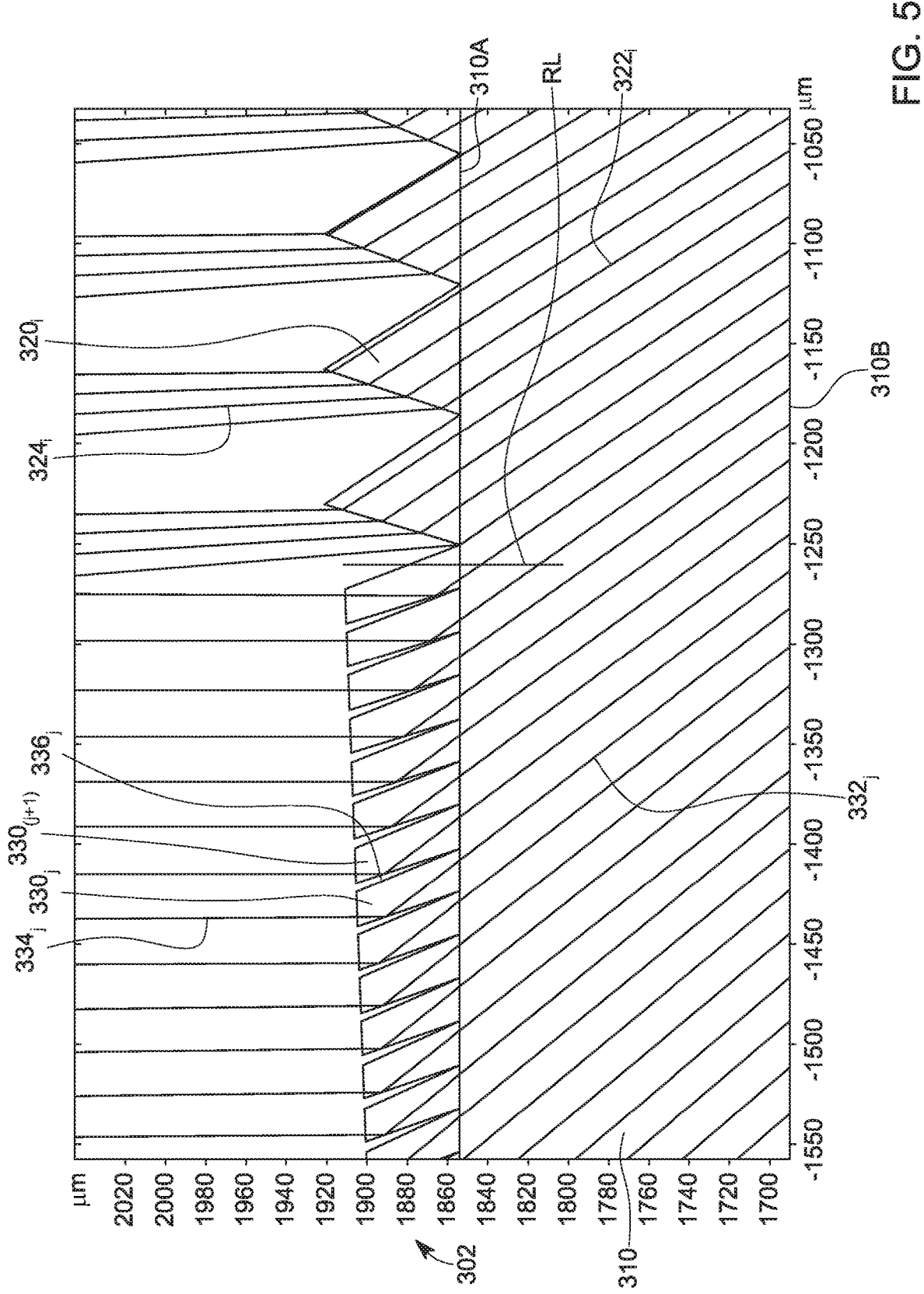
FIG. 5 illustrates wedges formed between the plural reflective features.

The characteristics of the plural reflective and plural refractive features on the coverslip 310 are now discussed with regard to FIG. 5. Note that the axes shown in this figure are distances expressed in µm. The plural reflective features 330j are shown being slanted relative to a reference line RL, which is perpendicular to a bottom planar surface 310B of the coverslip 310. The plural reflective features are formed directly on the top planar surface 310A of the coverslip 310. In this embodiment, it is assumed that the coverslip 310 has a rectangular cross section along its diameter.

Figure 6:
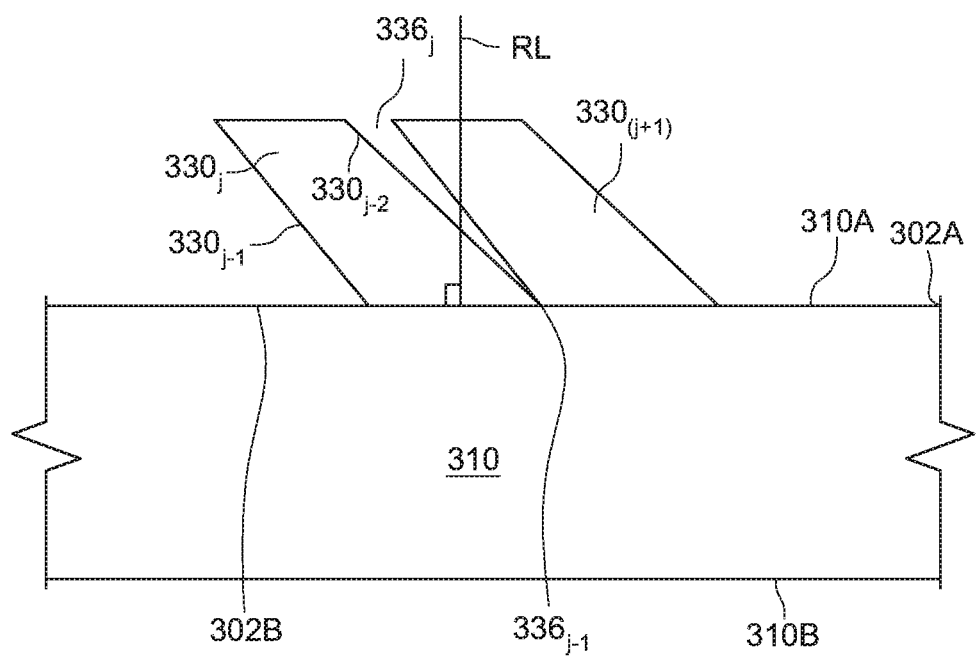
FIG. 6 illustrates two reflective features and their various properties.

Two adjacent reflective features 330j and 330(j+1) are both slanted in the same direction and form an undercut long feature 336j (a wedge), as better illustrated in FIG. 6. For simplicity, FIG. 6 shows only the two adjacent reflective features 330*j* and 330(*j*+1). Note that both reflective features 330*j* and 330(*j*+1) are inclined in the same direction relative to the reference line RL.

Due to this peculiar configuration, most of the existing removal methods cannot be used to create this lens. In other words, if one tries to start with a block of glass and then to remove by laser or other means (e.g., Femtoprint technology, which works for glass) a wedge shape portion of the material to form the undercut long feature 336*j* and the reflective features 330*j* and 330(*j*+1), that process would be difficult and/or slow as the size of the wedge material 336*j* is extremely small, in the order of 10 μm or less. Thus, the inventors have used a two-photon method for building up the lens by 3D printing. The two-photon method uses a two-photon polymerization process in which lasers can be used to 3D-print detailed microstructures.

In one application, the optical element 300 discussed above includes a coverslip 310 made of a transparent material and a lens 302 formed on the coverslip 310. The lens 302 includes plural refractive features 320*i* formed in a central portion 302A of the lens, and plural reflective features 330*j* formed in a ring portion 302B of the lens. The plural refractive features 320*i* refract light incoming from the coverslip and the plural reflective features 330*j* are shaped to achieve total internal reflection with the light incoming from the coverslip. In one application, the plural reflective features are shaped, along a radial direction of the lens, as trapezoids. Two lateral sides 330*j*-1 and 330*j*-2 of each plural reflective feature are slanted away from the central portion of the lens, as shown in FIGS. 5 and 6. In another application, any two adjacent reflective features of the plural reflective features contact each other on the coverslip and/or any two adjacent refractive features of the plural refractive features contact each other on the coverslip. However, it is possible that two adjacent reflective features and/or two adjacent refractive features do not contact each other on the substrate, i.e., there is a non-zero distance between the bases of these features. This feature may be valid for some or all the reflective and/or refractive features. In still another application, the plural refractive features are shaped, along a radial direction of the lens, as triangles. As illustrated in FIG. 6, the wedge 336*j* between any two adjacent reflective features 330*j* and 330(*j*+1) of the plural reflective features 330*j* has an apex 336*j*-1 located on the coverslip 310. The plural reflective features and the plural refractive features of the lens are formed on a planar face 310A of the coverslip 310.

Figure 7:
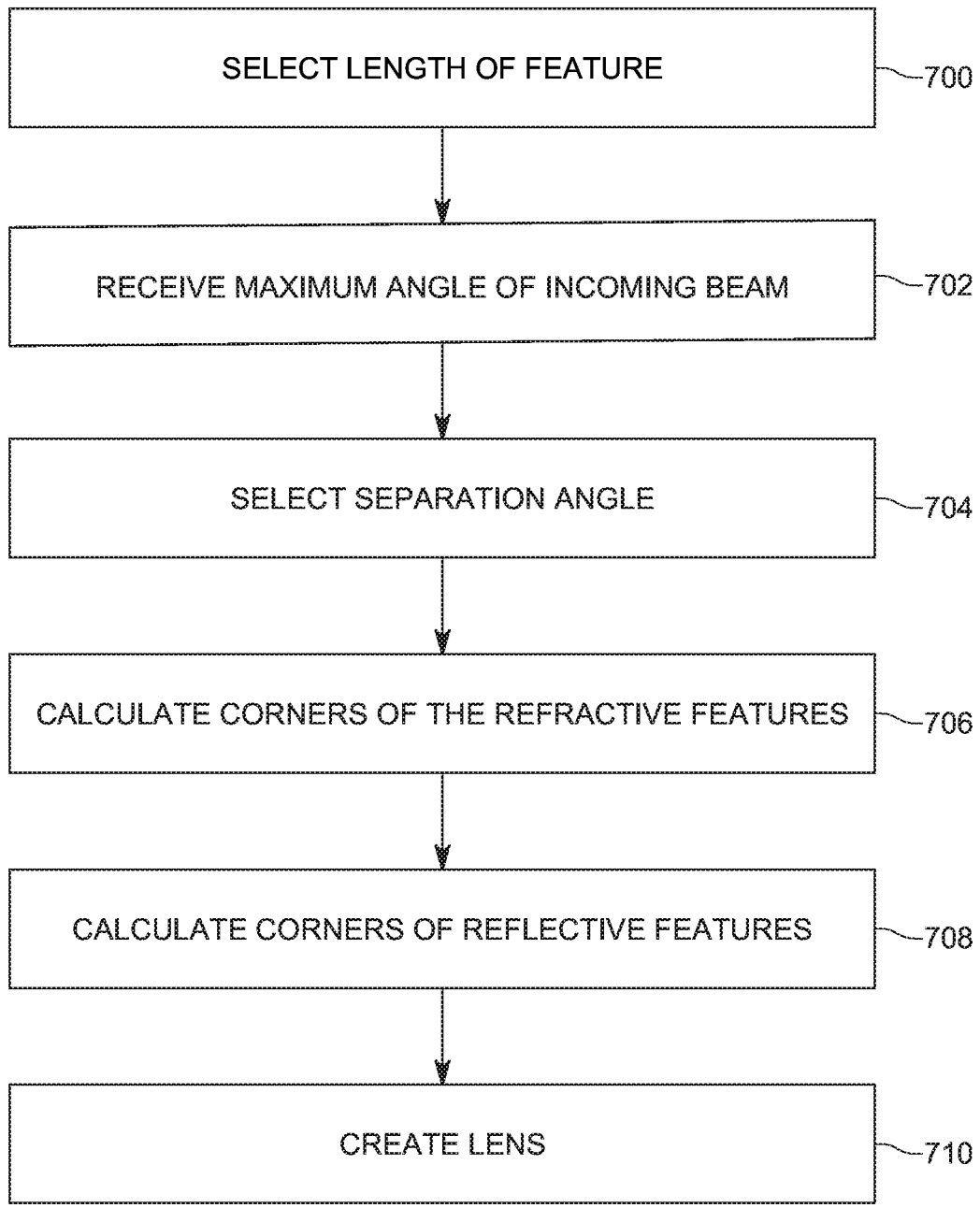
FIG. 7 is a flowchart of a method for calculating edges of the plural reflective and plural refractive features.
Figure 8:
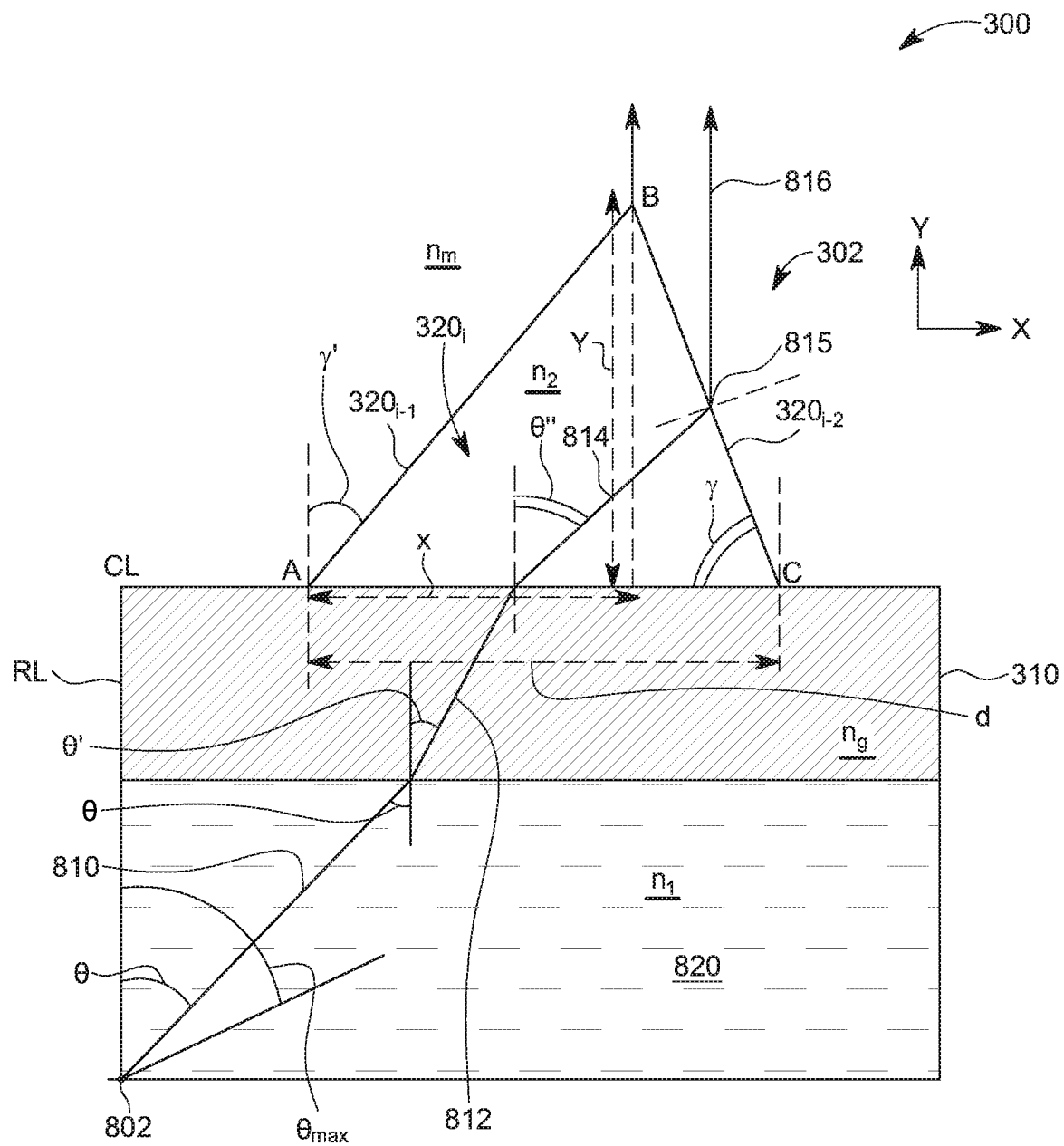
FIG. 8 illustrates a refractive feature and its characteristics.

A method for calculating each feature of the lens is now discussed with regard to FIG. 7. Because the lens has a circular symmetry, relative to a vertical direction, only its radial profile needs to be defined in this method. In step 700, a length "d" of a base of a refractive feature 320*i*, which is the same as the base for the reflective feature 330*j*, is selected. In one application, the refractive feature 320*i* has a length d different from a length of the reflective feature 330*j*. If this is the case, in step 700 a length for the reflective feature and a different length for the refractive feature are selected. The smaller the length d, the smaller will be the total volume of the lens. A minimum size for the length d is determined by the validity of the geometrical optics approximation (about 20 μm for a 1000 nm wavelength). In step 702, a maximum angle $\theta_{max}$ of the incoming beam is also selected. The maximum angle determines the NA of the lens. In this example, as shown in FIG. 8, a point source 802 is considered to be the focal point of the first microscope objective (not shown), i.e., all the light rays start from point 802. Thus, the maximum angle, which is shown in FIG. 8, is measured from a reference line RL that is perpendicular to the coverslip 310.

In step 704, a separation angle $\theta_s$ (see FIG. 3) is selected and this angle corresponds to the separation interface 304 between the reflective features 330*j* and the refractive features 320*i*. Between the center of the lens CL and the interface 304, deflection of the rays is obtained by refraction, and between the interface 304 and the outer circumference of the lens, deflection of the rays is mainly obtained by total internal reflection. In one application, it is possible to have a small contribution to the deflection of the rays by a refractive mechanism if the refractive indexes of the lens and the coverslip are different. In one application, the separation angle $\theta_s$ is around 34°. Other values may be used.

In step 706, for each refractive feature 320*i*, three edge points (or corners) A, B, and C are defined, while in step 708, for each reflective feature 330*j*, 4 edge points M, N, O, and P are defined. The edge points of each feature are calculated as now discussed. With regard to FIG. 8, a ray 810 is selected that makes an angle θ with the reference line RL. All possible angles θ that are smaller than the maximum angle $\theta_{max}$ may be considered for these calculations. In one embodiment, a difference between two adjacent angles θ that are used for these calculations is about 1°. In one application, the difference between two adjacent angles θ is proportional to the distance d, so that only one ray per refractive or reflected feature is selected. Other values may be used. Using the Snell law, it is possible to calculate the angles θ' and θ" of the rays 812 and 814, respectively, in the coverslip 310 and the refractive feature 320*i*. The Snell's law can be written as $n_1 \sin θ = n_g \sin θ' = n_2 \sin θ''$, where $n_g$ is the refractive index of the fluid 820 in which the lens 300 is placed (water usually), $n_g$ is the refractive index of the coverslip, and $n_2$ is the refractive index of the polymer material from which the lens 302 is made. Thus, the angle θ" of a ray per each refractive feature 320*i* may be analytically calculated.

The position of the edge B may be calculated if the angle γ of the face 320*i*-2 is determined. Note that in this embodiment, the shape of the refractive feature 320*i* is a triangle. The angle γ is determined by solving the following equation:

$$\gamma - a\sin\left(\left(\frac{n_m}{n_2}\right) \cdot \sin\gamma\right) + \theta'' = 0,$$

where $n_m$ is the refraction index of the medium above the lens. If parameter S is defined as: $S = \tan\gamma/(\tan(90-\theta'') + \tan\gamma)$, then the coordinates x and y of the edge B are given by $x = d \cdot S$ and $y = d \cdot \tan(90-\theta'') \cdot S$. Thus, for each refracting element, the edge points are given by: $A = (x_A, 0)$, $B = (x_A + x, y)$, and $C = (x_A + d, 0)$, where $x_A$ is the x coordinate measured from the center of lens CL. Note that for the refractive feature 320*i* closest to the center of the lens, $A = (0, 0)$, $B = (x, y)$ and $C = (d, 0)$. All the other refractive features have their edge A connected to a previous edge C of a previous refractive feature. Note that the ray 814 is refracted at point 815 on the face 320*i*-2 of the refractive feature 320*i*, resulting in ray 816, which emerges out of the refractive feature substantially parallel to the reference line RL.

Figure 9:
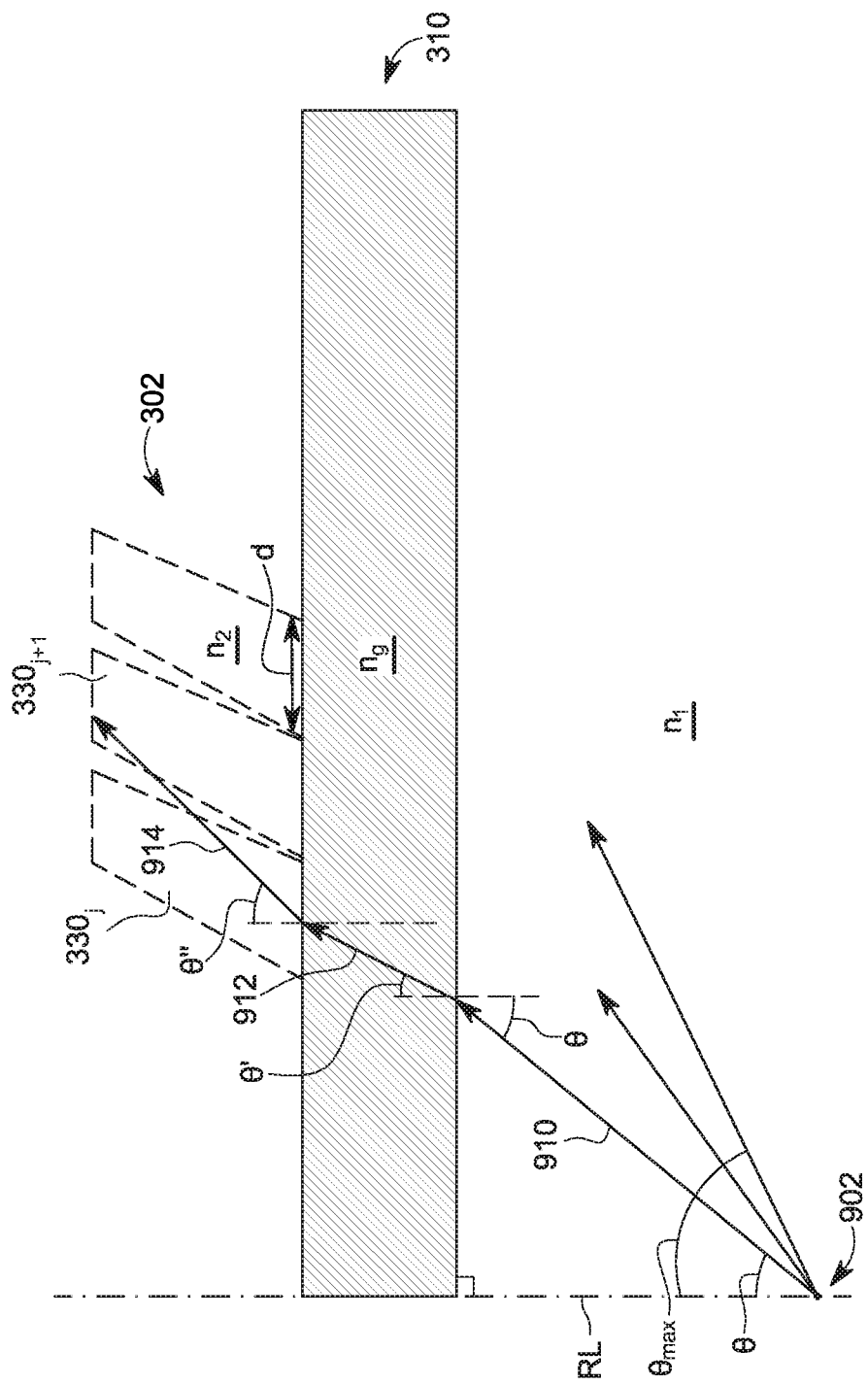
FIG. 9 illustrates two reflective features and their characteristics.
Figure 10:
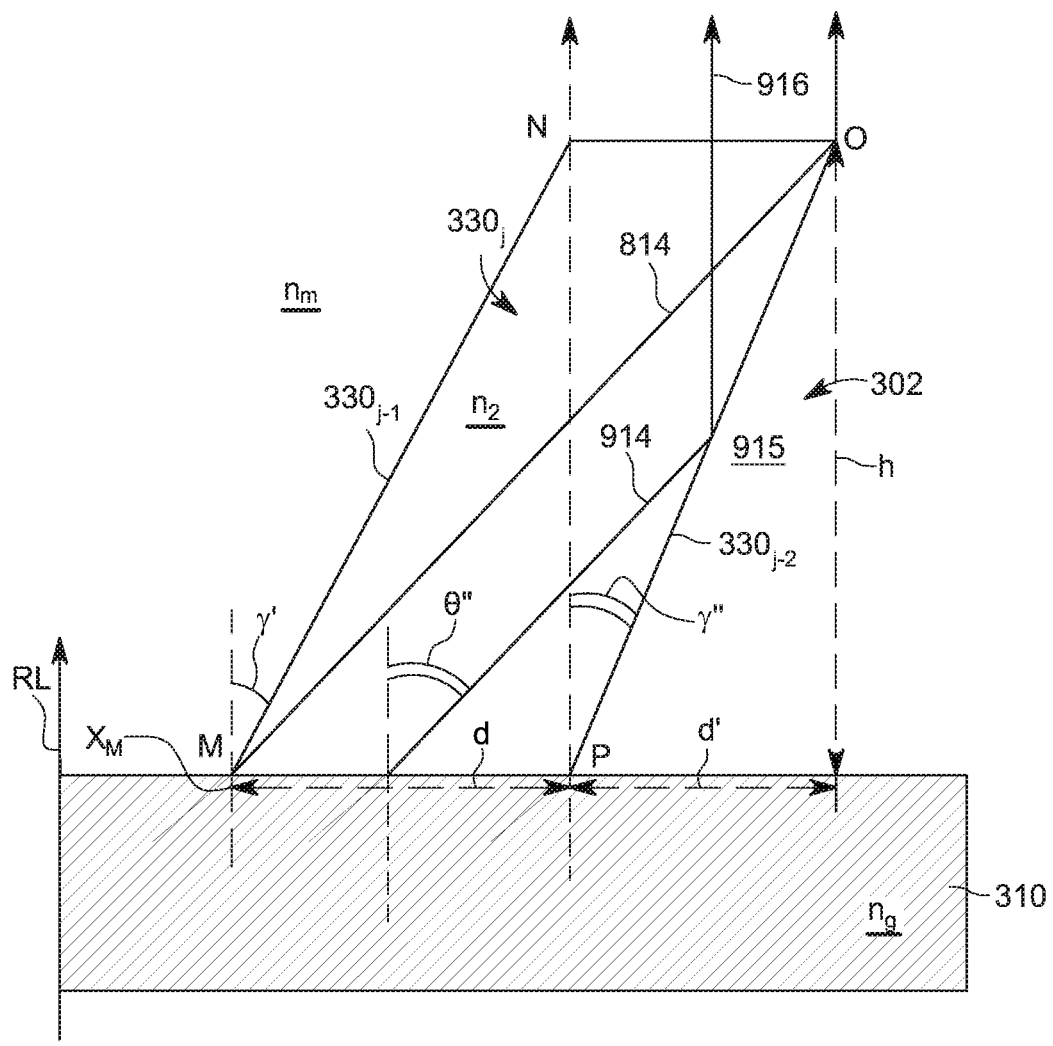
FIG. 10 illustrates a single reflective features and its edges.

The coordinates of the four edges M, N, O, and P for the reflective feature 330*j* are calculated with regard to FIGS. 9 and 10. In FIG. 9, a ray 910 is selected that makes an angle θ with the reference line RL. All possible angles θ that are smaller than the maximum angle $\theta_{max}$ may be considered for these calculations. In one embodiment, a difference between two adjacent angles θ that are used for these calculations is proportional to a distance d so that only one ray per feature is selected. Other values may be used. Using the Snell law, it is possible to calculate the angles θ' and θ" of the rays 912 and 914, respectively, in the coverslip 310 and the reflective feature 330$j$. The Snell's law can be written as $n_1 \sin \theta = n_g \sin \theta' = n_2 \sin \theta"$, where $n_1$ is the refractive index of the fluid in which the lens is placed (water usually), $n_g$ is the refractive index of the coverslip, and $n_2$ is the refractive index of the polymer material from which the lens 302 is made. Thus, the angle θ" of a ray per reflective feature 330$j$ may be analytically calculated.

With this angle, as illustrated in FIG. 10, the exact positions of the edges N and O may be calculated, assuming that edge M corresponds to the point where the reflective feature 330$j$ contacts, on the coverslip 310, a previous reflective or refractive feature. Note that the position of edge P is d μm away from edge M, along the surface of the coverslip 310. The angles γ' and γ" of the sloping faces 330$j$-1 and 330$j$-2 may be calculated as being γ'=θ"/2 and γ"=a tan((1−cos θ")/(cos θ"·sin θ")). To determine the coordinates of edges N and θ, the height h and the distance d' need to be calculated, where the height h is given by $$h = d \cdot \cos\theta" \cdot \frac{\sin\theta"}{(1-\cos\theta")}$$

and the distance d' is given by d'=d·cos θ". Thus, the coordinates of the four edges M, N, O, and P are given by M=($x_M$, 0), where $x_M$ is the coordinate of the edge M along the surface of the coverslip 310, measured from the central point of the lens CL, N=($x_M$+d, h), O=($x_M$+d+d', h), and P=($x_M$+d, 0). Note that the edges of the next reflective feature 330($j$+1) can be obtained by selecting a next value for angle θ and repeating all the above discussed calculations. Because the coordinates of the edges N and O depend on the selected angle θ, and because the angle θ increases as the selected reflective feature is further away from the center of lens CL, the locations of the edges N and O may be different for different reflective features. Note that ray 914 in FIG. 10 is totally reflected at point 915, in the face 330$j$-2 of the reflective feature 330$j$, and then exists the feature as ray 916, substantially parallel to the reference line RL.

Having the coordinates of each edge of each refractive and reflective feature, the method advances to step 710, where the lens 302 is generated by a two-photon process. One skilled in the art would understand that by choosing the size of the segment d, the number of refractive and reflective features is determined. Also, for each segment d, a single ray 810 or 910 is necessary for calculating the edges of the refractive and/or reflective features. In one application, for each segment d, an angle θ is selected so that the ray 810 or 910 intersects the middle of the segment d. Other ways for selecting the angle θ for each refractive and/or reflective element may be used. In one application, it is possible to select a segment d1 for the refractive features and a different segment d2 for the reflective features. In this case, the bases of these two features have different lengths. However, the process described above with regard to FIGS. 7-10 still applies. While the method discussed with regard to FIGS. 7-10 assumes that each edge A and C of a refractive feature is in contact with an adjacent edge C and A of another refractive feature (the same is assumed for the reflective elements for edges M and P), it is possible that a given gap G is implemented between adjacent edges of these features along the coverslip 310. In one application the gap G1 for the refractive elements is different from the gap G2 of the reflective elements. The refractive features have been shown in these figures to have a triangular shape while the reflective features have been shown to have a trapezoidal shape. In one application, all the faces of the reflective and refractive features are straight planes. In another application, one or more of the faces of the reflective and refractive features are curved.

Figure 11:
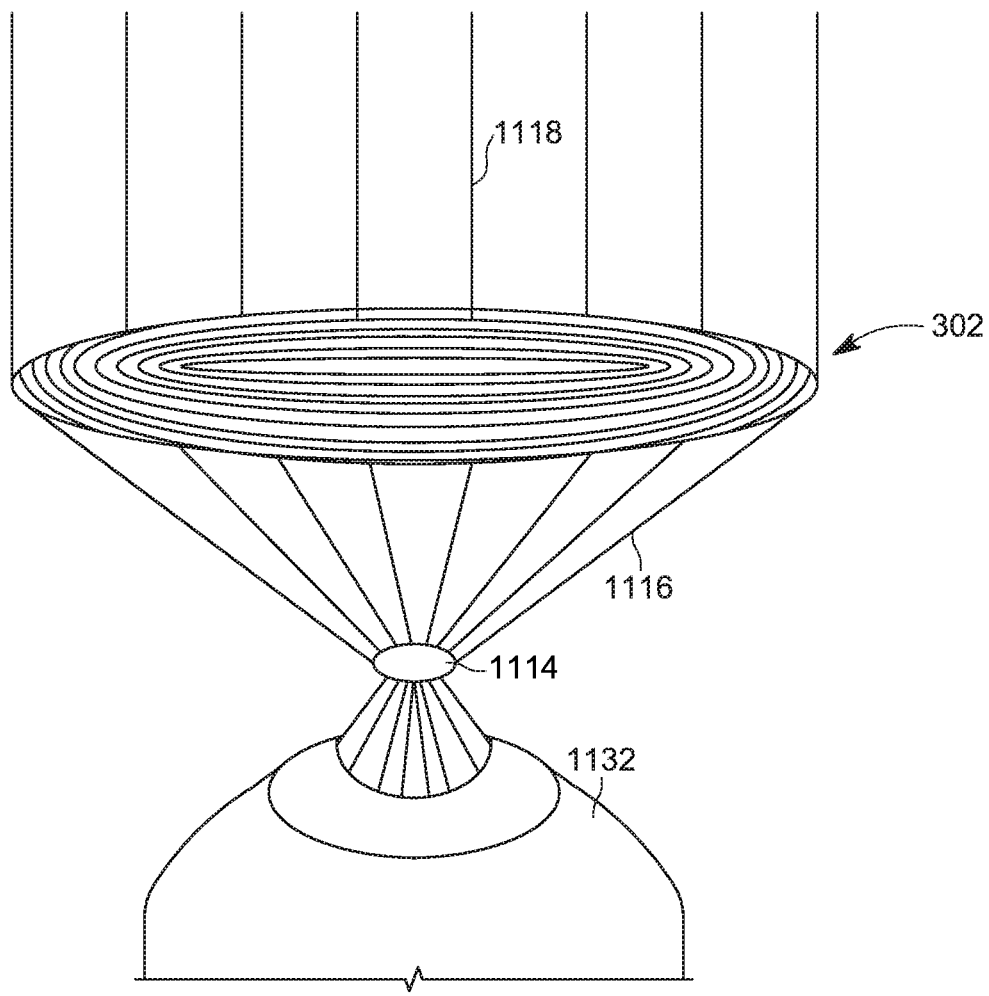
FIG. 11 illustrates how the lens collimates the light.

Those skilled in the art would understand that the profiles of the refractive and reflective features 320$i$ and 330$j$ shown in FIGS. 8-10 are along a radial direction, and because of the symmetry of the lens 302, those profiles are the same along any radius of the lens. This feature is illustrated in FIG. 11, where the lens 302 is shown receiving divergent rays 1116 from a living cell 1114, that is examined with a first high-NA objective 1132. The light rays 1118 passing through the lens 302 are shown being substantially parallel to each other. As previously noted, a thickness of the lens 302 is less than 500 μm, and more specifically 300 μm or less.

Figure 12:
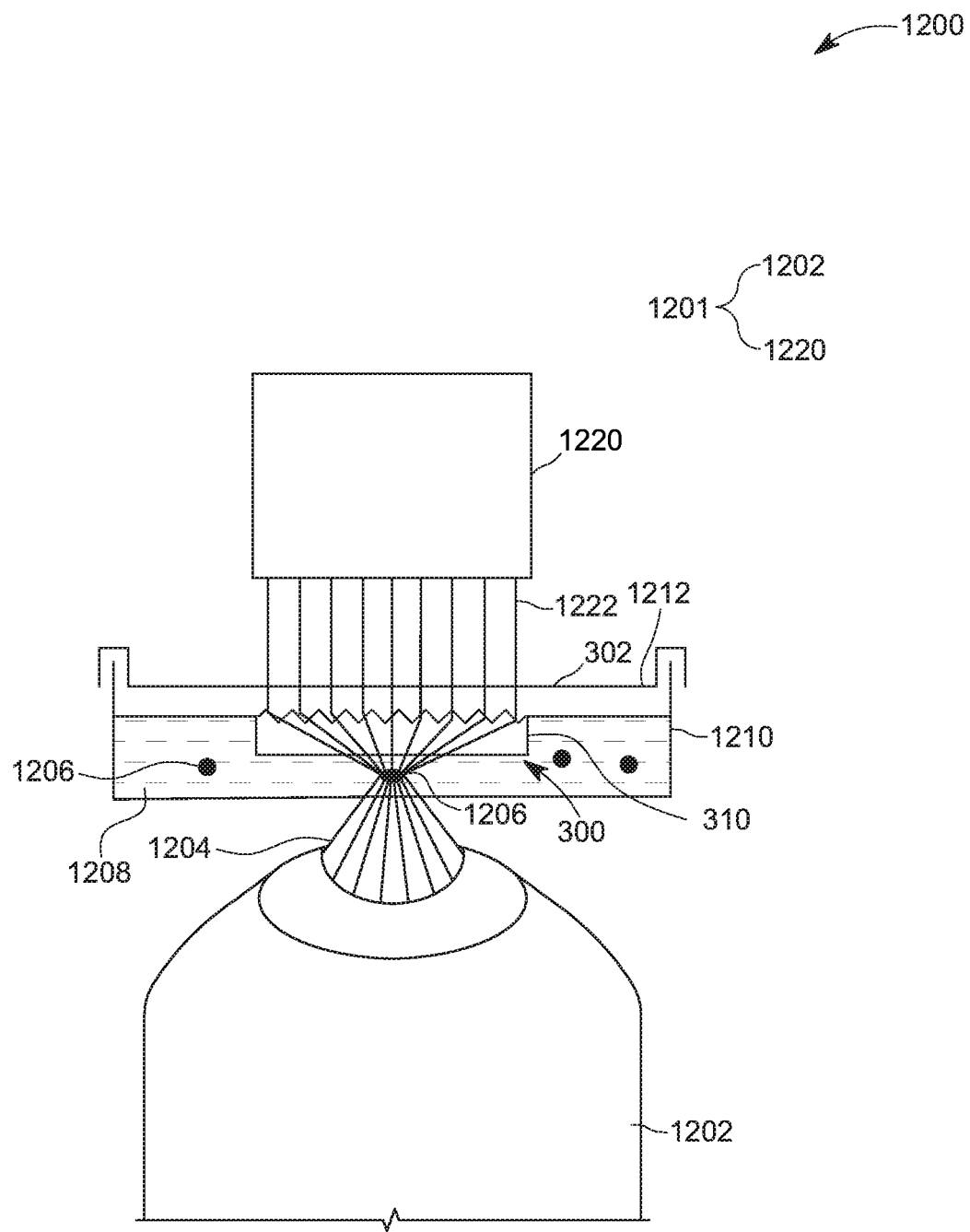
FIG. 12 illustrates how the lens is placed inside an incubator for collimating the light for a microscope.

This extremely small thickness of the lens makes this lens appropriate for microscopy based investigation of living cells that are maintained under controlled conditions in a closed environment and when "forward collection" is needed. For example, as illustrated in FIG. 12, a microscopy system 1200 includes a microscope 1201, an incubator or reactor 1210, and an optical element 300 that is placed inside the incubator 1210. The microscope 1201 includes a high-NA objective lens 1202 that focuses electromagnetic radiation 1204 (visible or infrared) onto one or more cells 1206 that are maintained in a fluid 1208, in the incubator 1210. The fluid 1208 may be water. The optical element 300 (which includes the lens 302 and the coverslip 310) is placed above the cell 1206, inside the incubator 1210. The optical element 300 is placed in the fluid 1208, so that at least the coverslip 310 is in direct contact with the fluid. Because of the extremely small thickness of the optical element 300, it fits inside the incubator, and the lid 1212 of the incubator 1210 can stay in place, thus, maintaining the sealed environment of the cell 1206. A light analyzer element (detection optical path) 1220, which is part of the microscopy system 1200, receives a substantially parallel beam 1222 of light from the lens 302. Note that the lid 1212 is flat and transparent and thus, it does not affect the path of the light in a substantial way.

Figure 1B:
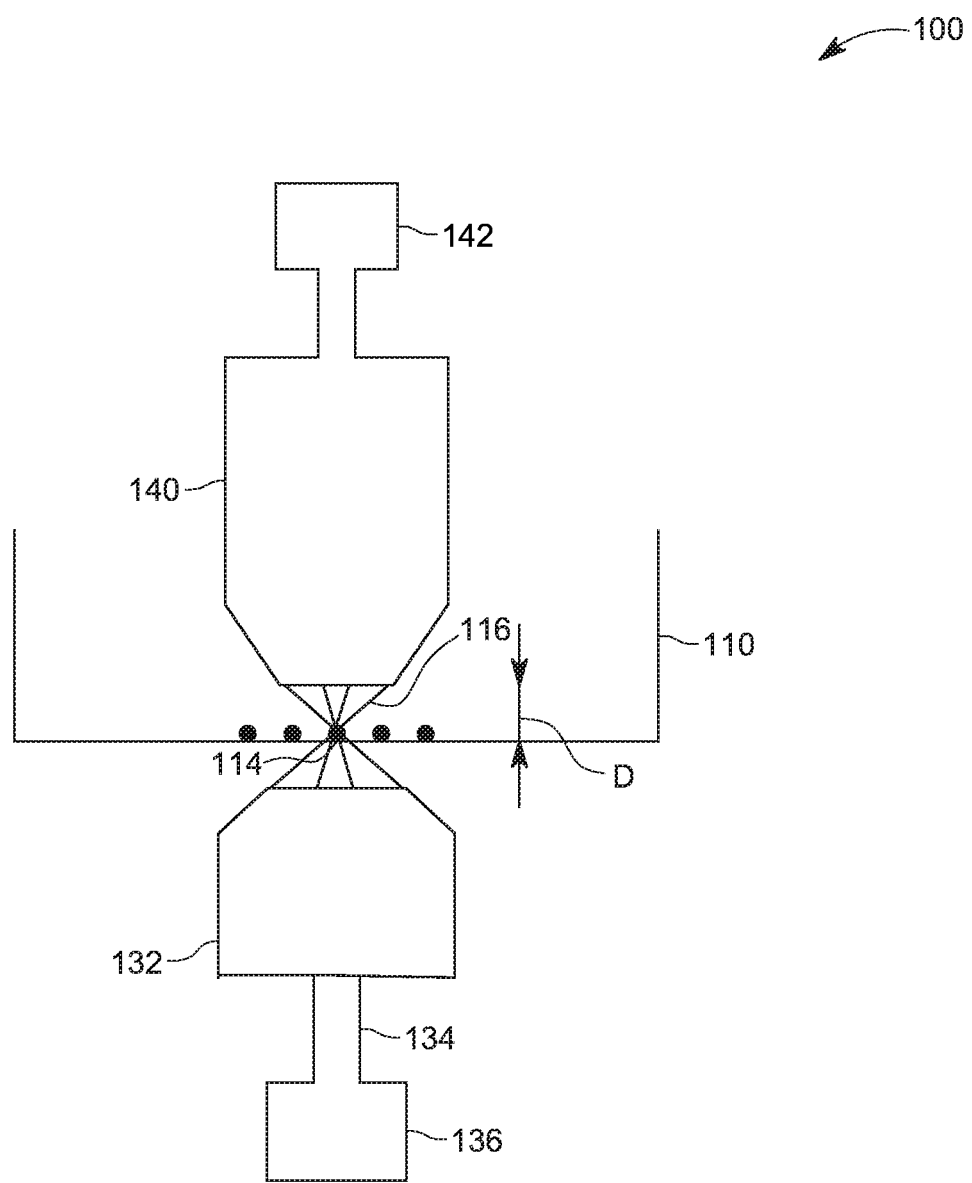

Efficient collection of forward transmitted/scattered/emitted photons 1222 in optical microscopes using high NA objectives 1202 is traditionally achieved by using a second microscope objective (see element 140 in FIGS. 1A and 1B) with similar NA and positioned above the sample 114. These objectives are usually bulky and expensive, because their design involves the stacking of multiple optical elements whose role is to minimize optical aberrations as the primary target is to maximize/optimize the objective's optical imaging performances (i.e., the quality of the image formed by the objective lens). However, when only a collimation capability of highly divergent beams, as created by the high NA objective 1202, is requested, to allow efficient proximal or distal collection of forward transmitted/scattered photons, such maximized imaging performances are not needed. Thus, for those situations, the optical element 300 is most appropriate. Additionally, the use of these bulky high-NA microscope objectives 140 for collection adds the additional side effect of creating issues while using compact "top-stage" incubators for live-cell experiments. In this regard, note that "top-stage" incubators are the solution of choice compared to "cage" incubators, which enclose most of the microscope, when one wants to perform experiments with fast changing environmental parameters (temperature, humidity, etc.) or one wants to avoid a critical part of the equipment (e.g., the electronics of the microscope) being inserted in high-humidity environments.

The 3D printed lens 302 is able to fit narrow environments, as inside above-mentioned top-stage incubators, to collimate transmitted/scattered/emitted beams generated by high NA objectives, e.g., allowing efficient distal collection of signals in several optical microscopy techniques as multiphoton-excited fluorescence microscopy, Second Harmonic Generation (SHG) microscopy, Coherent Anti-Stokes Raman (CARS) microscopy, or Stimulated Raman Scattering (SRS) microscopy.

The lens 302 has an effective field of view i.e., a limited region (in the order of millimeters) of the sample with respect to the center of the lens in which the light collection works as designed. However, this lens is designed to float on the water solution in which the sample of interest is contained, as illustrated in FIG. 12. The field of view can be extended by adding a thin layer of ferromagnetic material around the lens, which allows lateral shifting of the lens with respect to the sample when using an external magnet.

The maximum NA obtainable by this lens is equal to the refractive index of the immersion medium. If the fluid in which the lens is floating is water, then the NA is 1.33. Lens 302 can also be designed to be focusing or diverging. If the purpose of this lens is the collection of an optical signal, it can also operate in a NA reduction mode. Therefore, the lens' output is still diverging, but with a NA reduced compared to the one generated by the high NA objective 1202, and that is collected by the detection optical path. For example, the detection optical path 1220 in FIG. 12 can include a detector and a lens with a numerical aperture of 0.2. If the output from the lens 302 is less than 0.2 NA, the signal will be completely collected by the detection optical path. Therefore, NA of the output from the lens 302 needs to be less than the collection NA of the detection optical path.

Lens 302 can be used with SRS microscopy, where a high NA in collection is needed to minimize the unwanted additional contribution of the ubiquitous non-resonant cross-phase modulation (XPM) effect to the useful Raman signal. Indeed, in SRS microscopy, a microscope objective with a NA higher than the one used for excitation (usually >1 NA) is recommended for the collection of the transmitted beam. In simple words, this means that it is necessary to collect all the light coming from the excitation objective. These high-NA microscope objectives are bulky (they are typically 3-4 cm long, metallic cylinders, fitted with plural lenses inside) and have short working distances, on the order of a few millimeters or less. These traditional objectives are not appropriate for working with a "top-stage" sealed incubator.

The SRS microscopy is a powerful technique to perform biological experiments with live cells, which usually requires the use of an incubator to control environmental conditions for survival of the sample. In the case of "top-stage" incubators, they are closed chambers, as shown in FIG. 12, with an internal height of a few centimeters and topped with a glass transparent lid 1212. Therefore, for such an arrangement, it is not possible to fit inside the incubator a high NA microscope objective for the collection of the signal due to the short working distance and the presence of the lid. To have a NA>1, the optical element needs to work in immersion. Therefore, the optical element needs to stay inside the chamber. The lens 302 overcomes all these problems and will also maximize the collected signal.

For the CARS microscopy, the lens 302 would maximize the efficiency of detection of Raman photons in forward-direction detection schemes. For the Multiphoton fluorescence microscopy, the lens 302 would maximize the efficiency of detection of fluorescent emitted photons in forward-direction detection. For the SHG microscopy in forward scheme (the most used), the lens 302 would maximize efficiency of detection of second-harmonic photons in forward-direction detection.

Figure 13A:
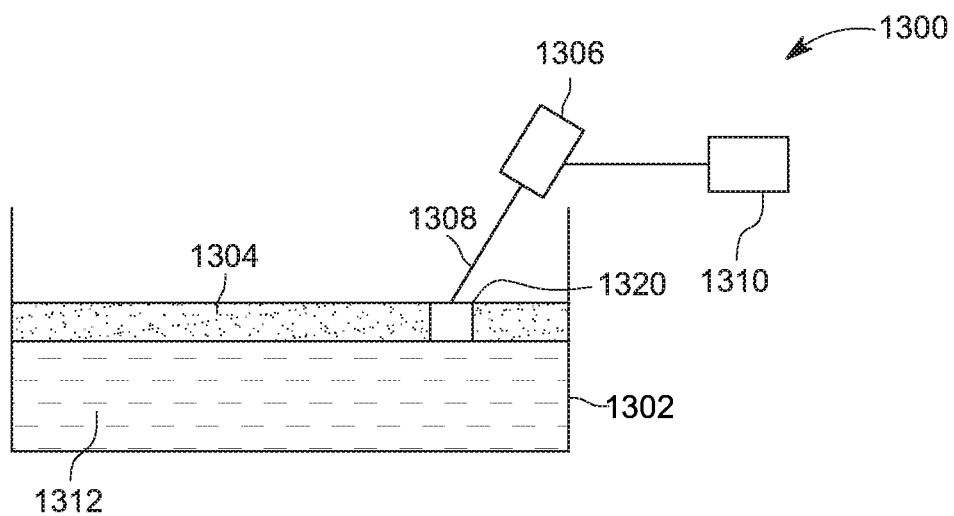
FIGS. 13A to 13C illustrate how the lens is manufactured.
Figure 13B:
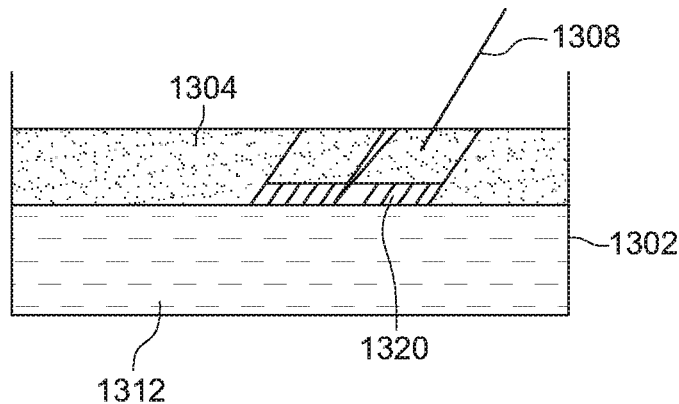
Figure 13C:
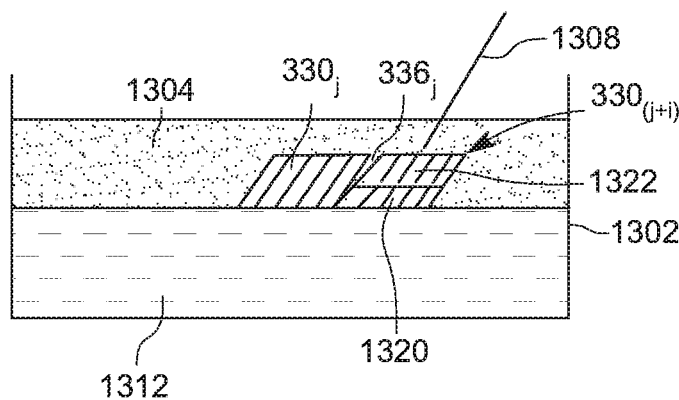

A set up for making the lens 302 on the coverslip 310 is now discussed with regard to FIGS. 13A to 13C. FIG. 13A illustrates a system 1300 that includes a container 1302 that holds a liquid polymer 1304 (other substances may also be used). A laser system 1306 is configured to emit a laser beam 1308 into the container. The intensity, position, and activation time of the laser system are controlled by a controller 1310, which is electrically connected to the laser system. After the coordinates of each edge of the refractive and reflective features have been calculated with the method illustrated in FIG. 7, these coordinates are stored in a memory of the controller 1310. In one embodiment, the controller 1310 has a processor (to be discussed later) that can perform the calculations indicated in the method of FIG. 7.

Based on the coordinates of each edge of the refractive and reflective elements, the controller 1310 instructs the laser system 1306 to irradiate with the laser beam 1308 locations that correspond to the interior of the refractive features 320i or reflective features 330j, so that the polymer at those locations becomes solid while the polymer at the locations that are not irradiated by the laser beam remain liquid. For example, assume that a piece of glass (which becomes the coverslip 310) is placed in the container 1302 and the fluid polymer 1304 is positioned above the glass 310. The laser beam 1308 will harden a portion 1320, but not the remaining of the fluid polymer. Then, as shown in FIG. 13B, the laser beam 1308 is directed to the solution in top of the hardened portion 1320, to harden an additional portion 1322, as shown in FIG. 13C. After the additional portion 1322 has hardened enough, further fluid polymer may exist on top of the hardened part and again the laser beam 1308 is directed to the top of the hardened portion 1322 to harden additional polymer. In this way, the reflective and refractive features are 3D printed. Note that this method allows for the material in the wedge 336j see FIG. 3C) to remain liquid, which is removed at the end of the process so that in fact there is no material between adjacent features 330j and 330(j+1). In this way, the features 330j can be manufactured to have small size and a large undercut between them, which is not possible with the traditional material removal methods.

Figure 14:
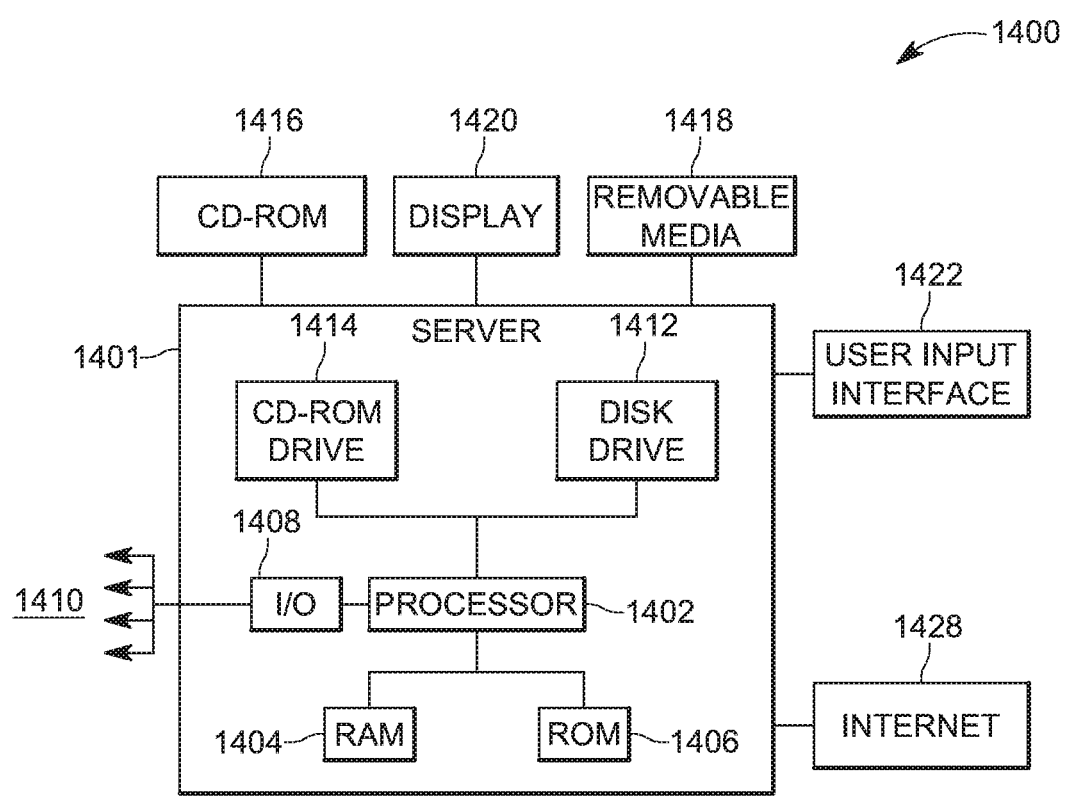
FIG. 14 is a schematic diagram of a controller for manufacturing the lens.

The above-discussed procedures and methods may be implemented within a controller 1400 as illustrated in FIG. 14. Hardware, firmware, software or a combination thereof may be used to perform the various steps and operations described herein. Controller 1400 (which corresponds to controller 1310 in FIG. 13A), which is suitable for performing the activities described in the above embodiments, may include a server 1401. Such a server 1401 may include a central processor (CPU) 1402 coupled to a random access memory (RAM) 1404 and to a read-only memory (ROM) 1406. ROM 1406 may also be other types of storage media to store programs, such as programmable ROM (PROM), erasable PROM (EPROM), etc. Processor 1402 may communicate with other internal and external components through input/output (I/O) circuitry 1408 and bussing 1410 to provide control signals and the like. Processor 1402 carries out a variety of functions as are known in the art, as dictated by software and/or firmware instructions.

Server 1401 may also include one or more data storage devices, including hard drives 1412, CD-ROM drives 1414 and other hardware capable of reading and/or storing information, such as DVD, etc. In one embodiment, software for carrying out the above-discussed steps may be stored and distributed on a CD-ROM or DVD 1416, a USB storage device 1418 or other form of media capable of portably storing information. These storage media may be inserted into, and read by, devices such as CD-ROM drive 1414, disk drive 1412, etc. Server 1401 may be coupled to a display 1420, which may be any type of known display or presentation screen, such as LCD, plasma display, cathode ray tube (CRT), etc. A user input interface 1422 is provided, including one or more user interface mechanisms such as a mouse, keyboard, microphone, touchpad, touch screen, voice-recognition system, etc.

Server 1401 may be coupled to other devices, such as sources, detectors, etc. The server may be part of a larger network configuration as in a global area network (GAN) such as the Internet 1428, which allows ultimate connection to various landline and/or mobile computing devices.

The disclosed embodiments provide an optical element that has a small height and a large numerical aperture for light collimation. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A catadioptric optical element comprising:
a substrate made of a transparent material; and
a lens formed on the substrate,
wherein the lens includes,
plural refractive features formed on a central portion of the lens, and
plural reflective features formed on a ring portion of the lens,
wherein the plural refractive features are shaped and sized (1) to refract divergent light originating in a liquid, the divergent light incoming from the substrate when the substrate is placed in the liquid, and (2) to direct first outcoming light rays to be parallel to each other in air,
wherein the plural reflective features are shaped and sized (1) to achieve total internal reflections with the divergent light incoming from the substrate when placed in the liquid, and (2) to direct second outcoming light rays to be parallel to each other and to the first outcoming light rays in air, and
wherein the plural reflective features are shaped, along a radial direction of the lens, as trapezoids.

2. The optical element of claim 1, wherein two lateral sides of each plural reflective features are slanted away from the central portion of the lens.

3. The optical element of claim 1, wherein two adjacent reflective features of the plural reflective features do not touch each other on the substrate.

4. The optical element of claim 1, wherein two adjacent refractive features of the plural refractive features do not touch each other on the substrate.

5. The optical element of claim 1, wherein the plural refractive features are shaped, along a radial direction of the lens, as triangles.

6. The optical element of claim 1, wherein there is a wedge between two adjacent reflective features of the plural reflective features and the wedge has an apex located on the substrate.

7. The optical element of claim 1, wherein plural reflective features and the plural refractive features of the lens are formed on a planar face of the substrate.

8. The optical element of claim 1, wherein each edge of the plural reflective features and the plural refractive features is parametrized.

9. The optical element of claim 1, wherein the substrate includes glass or plastic and the reflective and refractive elements include a polymer or glass.

10. A method for defining a catadioptric optical element, the method comprising:
selecting a length d of plural refractive features;
selecting a maximum angle of an incoming light beam;
selecting a separation angle that defines an interface between the plural refractive features and plural reflective features;
calculating three edges of each of the plural refractive features relative to a central point of the optical element so that divergent light, incoming from a liquid, is refracted so that first outcoming light rays are parallel to each other in air;
calculating four edges of each of the plural reflective features relative to the central point of the optical element, based on a refractive index of the liquid in which the optical element is placed, so that the divergent light, incoming from the liquid, is reflected such that second outcoming light rays are parallel to each other and to the first outcoming light in air; and
making the optical element with a two-photon process or a 3D printing subtractive method to have the plural refractive features and the plural reflective features.

11. The method of claim 10, further comprising:
3D printing the plural refractive features and the plural reflective features from a fluid polymer, on a substrate made of a transparent material.

12. The method of claim 10, wherein the plural refractive features and the plural reflective features form a lens.

13. The method of claim 12, further comprising:
forming the plural refractive features on a central portion of the lens, and
forming the plural reflective features on a ring portion of the lens, wherein the plural refractive features are shaped to refract light incoming from the substrate and the plural reflective features are shaped to achieve total internal reflections with the light incoming from the substrate.

14. The method of claim 10, further comprising:
shaping the plural reflective features, along a radial direction of the lens, as trapezoids.

15. The method of claim 14, wherein two lateral sides of each plural reflective features are slanted away from the central portion of the lens.

16. The method of claim 10, further comprising:
forming two adjacent reflective features of the plural reflective features to contact each other on the substrate.

17. The method of claim 10, further comprising:
forming two adjacent refractive features of the plural refractive features to contact each other on the substrate.

18. The method of claim 10, further comprising:
forming the plural refractive features, along a radial direction of the lens, as triangles.

19. The method of claim 10, further comprising:
forming a wedge between two adjacent reflective features of the plural reflective features so that the wedge has an apex located on the substrate.

20. The method of claim 10, wherein the step of calculating three edges of each of the plural refractive features uses the Snell law and a light ray that enters a base of each of the plural refractive features.

21. The method of claim 10, wherein the step of calculating four edges of each of the plural reflective features uses the Snell law and a light ray that enters a base of each of the plural reflective features.

22. A microscopy system comprising:
a microscope having an objective lens and a light analyzer element;
an incubator configured to hold at least one cell in a liquid; and
a catadioptric optical element configured to be placed in the liquid inside the incubator,
wherein the catadioptric optical element has a total height smaller than 500 µm,
wherein the objective lens and the light analyzer element are placed outside the incubator, on opposite sides of the incubator, and
wherein the objective lens is configured to direct light to the at least one cell, the catadioptric optical element is configured to capture divergent light from the at least one cell, transform the divergent light into parallel light, and direct the parallel light to the light analyzer element.

23. The microscopy system of claim 22, wherein the optical element comprises:
a substrate made of a transparent material; and
a lens formed on the substrate,
wherein the lens includes,
the plural refractive features formed on a central portion of the lens, and
the plural reflective features formed on a ring portion of the lens,
wherein the plural refractive features are shaped to refract light incoming from the substrate and the plural reflective features are shaped to achieve total internal reflections with the light incoming from the substrate.

* * * * *